Aug. 9, 1932.  J. T. WELCH  1,871,229
FISHING ROD
Filed April 24, 1931
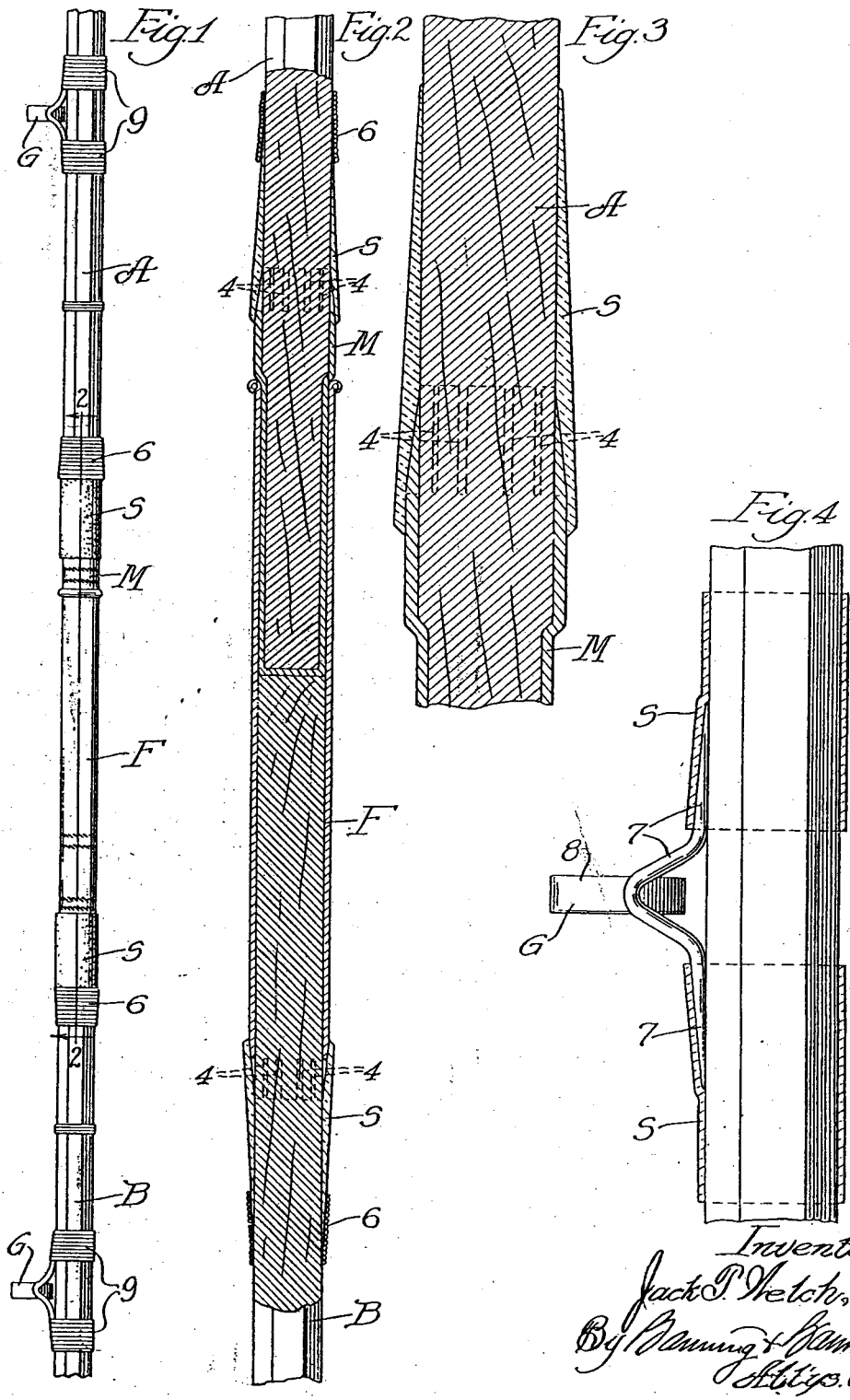

Patented Aug. 9, 1932

1,871,229

UNITED STATES PATENT OFFICE

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN

FISHING ROD

Application filed April 24, 1931. Serial No. 532,393.

This invention which relates to fishing rods is concerned with the application thereto of one or more bands or sleeves by which to accomplish certain desired results. Such bands or sleeves may advantageously be employed to secure in place the several line guides that are mounted on the rod and/or to reinforce a sectional rod in the region of its joints. Accordingly my invention has to do with such features alone or in combination, and also with the method by which such bands or sleeves are applied to the rod.

In the use of a jointed fishing rod, whether the same be made of bamboo, wood, metal, or other material, it is commonly found that the weakest place where breakage is most apt to occur is close to the ends of the ferrules which are applied to the joined rod sections. If the rod splits or breaks, as sometimes happens under stress, the owner's misfortune will, in all probability, be aggravated by loss of the fish whose struggles may have occasioned the mishap. A sportsman, in particular, demands a high grade rod having both a considerable flexibility and adequate strength, and is easily dissatisfied if deficient in either respect. With a view to strengthening the rod in its weakest places, i. e., adjacent the ferrules at the joints, the sleeves produced and applied in accordance with my invention may advantageously be used. Also, as will hereinafter be pointed out in detail, the line guides carried on the rod may be anchored firmly in position by sleeves of this same general character. In the accompanying drawing is illustrated a suggestive exemplification of my invention in the manner following:

Figure 1 is a view in elevation of a portion of a jointed fishing rod showing the connected ends of two adjacent sections thereof;

Fig. 2 is an enlarged fragmentary section on line 2—2 of Fig. 1;

Fig. 3 is a further enlarged fragmentary longitudinal section showing the application of a reinforcing sleeve over the end of one ferrule and the adjacent portion of the rod section; and Fig. 4 is an enlarged view in elevation of the portion of the rod whereon is mounted a line guide anchored in position by two such sleeves each shown in section.

The illustrated portions of a conventional jointed rod comprise sections A and B which may be made of bamboo, wood, metal, or other suitable material. Fitted over one end of the rod section B is a ferrule F extending beyond the rod end to form a socket wherein may be received the male ferrule M which is applied over the adjoining end of the rod section A. Each ferrule may be tightly secured to its associated rod section in the usual way, as by cement or a cross pin (not shown). Carried by either or both sections are line guides G which may be of any conventional design.

The ferrule ends which are remote from each other are desirably, although not necessarily, tapered down toward the surface of the rod sections whereon they are mounted. Also, as is common practice, the ferrules may be serrated by the provision of longitudinal slots 4 at their tapered ends, thereby forming relatively flexible tongues at the ends of the ferrules. It has been found that such a construction tends to greater strength in the zone of each ferrule where breakage is most apt to occur.

Although numerous expedients have been adopted to strengthen the rod in the region of each ferrule end, a weakness at such points still persists. Under stress, the rod will flex, as is intended, but at the juncture of the ferrules with the ends of the rod sections, this flexation is hampered. To strengthen the rod at such points, I apply thereto sleeves S which are fitted closely over the rod and slid into position over the ends of the ferrules that are mounted thereon.

The sleeve construction which I have found entirely suitable for the purposes of this invention is desirably made of some such material as has a cellulose base—pyralin, for example. As shown in the drawing, one end of the sleeve is required to ride over the end of the associated ferrule for a slight distance, and in doing so it becomes firmly positioned in place. If desired, circumferential windings 6 of silk or other material, such as commonly surround a fishing rod, may be applied over each sleeve at one point to assist in securing it in position. By so shaping the sleeve that one or both ends are tapered down close to the associated parts, as suggested in the drawing, it will present a smooth and inconspicuous appearance.

There is a particular advantage resulting from the use of a reinforcing sleeve having a cellulose base with a rod made of bamboo, wood, or fibre, such as is commonly used by sportsmen. Bamboo, in particular, is a material which tends to dry and shrink with age. A metallic ferrule applied to a rod section of such material tends in consequence to loosen its connection therewith as the rod shrinks. A sleeve of the kind specified applied over both the rod and ferrule tends also to shrink with age, thereby maintaining its secure anchorage with each. Prior to securing the sleeve in place, it is desirable that it be expanded and made pliable. This I accomplish by a solution suitable for the purpose. One containing alcohol in a limited amount will be found satisfactory. A closely fitting sleeve applied in this condition to the rod will, upon becoming dry, contract so as to adhere firmly to both the rod and ferrule. The sleeve so fitted is possessed of sufficient flexibility to give as required when the rod is flexed, and so is admirably adapted as a joint reinforcement. Not only do I provide a reinforcement at the joint between a ferrule and rod section, but also a means for enhancing the secure connection of the ferrule to the rod. The likelihood of rod breakage, when the present reinforcing sleeve is used, is considerably reduced, and this result is attained without in any degree impairing the flexibility of the rod.

In Fig. 4 I have suggested the use of such a sleeve for anchoring the line guides that are carried upon the rod. Such a guide may consist of a wire frame formed with oppositely extended aligned feet 7 between which is an eye 8. The feet are flattened upon the base, as is usual, for resting squarely upon the rod surface, and to secure the guide against movement, I apply a pair of sleeves S, one over each foot of the guide. The sleeves so fitted upon the rod are first enlarged and rendered pliable, as by dipping in a solution of the kind already noted, and while in this condition are slid to position upon the rod over the feet of the guides which are to be affixed thereto. Owing to the volatile character of the alcohol constituent in such a solution, the sleeves will quickly dry and contract, thereby maintaining a tight hold upon both the guide feet and rod. If desired, thread windings 9 may be arranged over the sleeves, as indicated in Fig. 1.

The features of improvement characterizing this invention have to do both with the application of self-shrinking sleeves to a rod, which perhaps is self-shrinking also, to maintain a tight connection therewith and with selected fittings thereupon over a prolonged period, and with the conditioning of such sleeves for application to the rod in the manner already described; accordingly protection is herein sought in respect of such a construction, and the method by which it is attained, as set out in the claims following:

I claim:

1. The method of reinforcing a flexible fishing rod formed of a material which shrinks with age which consists in applying circumferentially over a selected portion of the rod a tight fitting sleeve in a wet expanded pliable condition which, upon drying, contracts and hardens withal remaining flexible, the sleeve material having a tendency further to shrink with age whereby it remains closely fitted upon the rod.

2. The method of securing a fitting upon a shrinkable fishing rod which consists in applying circumferentially upon the rod and over a part of the fitting a pre-expanded tight fitting sleeve, in thereafter contracting the sleeve upon the rod and fitting, the sleeve being further shrinkable with age whereby to remain closely fitted upon the rod.

3. The method of securing a fitting upon a fishing rod which consists in applying circumferentially upon and over a part of the fitting a tight fitting sleeve of pyralin rendered expansible and pliable with an alcohol solution which, upon drying, contracts and hardens withal remaining flexible.

4. The method of securing a fitting upon a fishing rod which consists in treating a sleeve normally hard withal flexible to render it temporarily pliable and expanded, and in applying the sleeve in such condition circumferentially and snugly upon the rod and over a part of the fitting thereupon prior to contraction of the sleeve by which its connection with the rod and fitting is tightened.

5. The method of securing a fitting upon a fishing rod which consists in treating a sleeve, of such size as will snugly embrace the rod and fitting, in a manner to temporarily expand the sleeve for easy application upon the rod, and then while in such expanded condition in moving the sleeve to position upon the rod and over part of the fitting thereupon preliminary to contraction of the sleeve by which the tightness of its connection with the rod and fitting is increased.

6. The method of reinforcing a fishing rod at its point of connection with a ferrule applied thereto which consists in fitting over adjoining portions of the rod and ferrule a sleeve having a cellulose base, and in rendering the sleeve plastic for adhesion to the surfaces covered thereby.

JACK T. WELCH.